United States Patent [19]

Heinze et al.

[11] Patent Number: 5,731,646
[45] Date of Patent: Mar. 24, 1998

[54] HEAT-PROTECTED MOTOR HOUSING WITH METAL CASING AND PLASTIC PLATE

[75] Inventors: Mark Heinze, Kirchheim/Neckar; Martin Czermak, Bietigheim-Bissingen; Udo Baumeister, Bietigheim-Bissing; Bernd Walther, Bietigheim-Bissingen; Roland Buhler, Heilbronn, all of Germany

[73] Assignee: ITT Automotive Europe GmbH, Frankfurt, Germany

[21] Appl. No.: 569,143

[22] PCT Filed: Jun. 21, 1994

[86] PCT No.: PCT/EP94/02019

§ 371 Date: Aug. 15, 1996

§ 102(e) Date: Aug. 15, 1996

[87] PCT Pub. No.: WO95/00998

PCT Pub. Date: Jan. 5, 1995

[30] Foreign Application Priority Data

Jun. 24, 1993 [DE] Germany ............ 43 21 027.9

[51] Int. Cl.⁶ .................. H02K 5/04; H02K 5/16
[52] U.S. Cl. ................. 310/89; 310/90; 310/43
[58] Field of Search ................. 310/40 MM, 43, 310/89, 90, 154, 42

[56] References Cited

U.S. PATENT DOCUMENTS

| 3,824,684 | 7/1974 | Wheeler | 310/90 |
|---|---|---|---|
| 4,309,815 | 1/1982 | Schmitt et al. | 310/89 |
| 4,623,810 | 11/1986 | Smith | 310/90 |
| 4,823,032 | 4/1989 | Ward et al. | 310/89 |
| 4,862,582 | 9/1989 | Henck | 310/43 |
| 5,138,208 | 8/1992 | Kondo et al. | 310/64 |
| 5,201,111 | 4/1993 | Prohaska | 310/89 |
| 5,268,607 | 12/1993 | McManus | 310/89 |

FOREIGN PATENT DOCUMENTS

| 0360546 | 3/1990 | European Pat. Off. . |
|---|---|---|
| 1552542 | 1/1969 | France . |
| 2377723 | 8/1978 | France . |
| 2419604 | 10/1979 | France . |
| 1488596 | 4/1969 | Germany . |
| 1488474 | 1/1970 | Germany . |
| 2411622 | 3/1974 | Germany . |
| 2535210 | 2/1977 | Germany . |
| 3038135 | 4/1981 | Germany . |
| 3842588 | 12/1988 | Germany . |
| 634424 | 11/1978 | U.S.S.R. . |
| 1122951 | 8/1968 | United Kingdom . |
| 1207131 | 9/1970 | United Kingdom . |
| 1261859 | 1/1972 | United Kingdom . |
| 2062365 | 5/1981 | United Kingdom . |
| WO8707097 | 11/1987 | WIPO . |

OTHER PUBLICATIONS

Search of the German Patent Office for Application P4321027.9.
English Translation of the International Preliminary Examination Report for Application PCT/EP94/02019.

*Primary Examiner*—Clayton E. LaBalle

[57] ABSTRACT

A metal heat dissipation element is made an integral part of a metal houses of a motor, then a bearing plate of plastic material is injection-molded onto the housing. Preferred embodiments relate to the increased strength of the housing for which purpose additional plastic components in the form of webs are produced in the injection-molding operation.

20 Claims, 3 Drawing Sheets

HEAT-PROTECTED MOTOR HOUSING WITH METAL CASING AND PLASTIC PLATE

TECHNICAL FIELD

The present invention relates to an electric motor, in particular an electric motor for wiper systems.

BACKGROUND OF THE INVENTION

With respect to motors of this type which are mass produced, it is particularly important that they have a long useful life and be inexpensive to manufacture. The selection of the materials to be used should take into account the demands made on the capacity of the motor and the properties of the materials. For example, plastic materials permit the injection-moulding of relatively complicated shapes. However, plastic materials have a poor heat conductivity. Metal, in turn, has good heat conductivity with a low magnetic resistance but yields to corrosion. Further, the combination of plastics and metal involves difficulties due to their different expansion characteristics. Also, elements made of different materials must be connected with sufficient strength to permit operation over the projected life of the motor while permitting separation for recycling when the motor is finally removed from operation.

A large number of motor housings are known in the art wherein the individual motor elements are made of plastics and metal. For example, German patent application, No. 30 38 135, discloses a housing of a small-size electric motor having a cylindrical metal casing to which a plastic bearing plate is mounted. In addition, the motor plate has a heat dissipation element made of metal which makes catch at the motor beating. In this arrangement, the heat dissipation element can abut the metal casing of the housing, the heat dissipation effect being increased still further.

An object of the present invention is to provide an inexpensive, high-resistance long-service electric motor, in particular an electric motor for windshield wiper systems, by appropriately selecting the metal and plastic materials used therein. In addition, the motor shall have an improved ability to dissipate heat caused by operation of the motor.

In principle, the present invention has for its purpose to integrally connect the metal casing to the heat dissipation element and to injection-mould the motor plate including bearing to the so formed structure. A special benefit provided by this arrangement is that the heat produced in the motor bearing can be dissipated satisfactorily to the large-surface metal casing due to the material transition between the metal casing and the heat dissipation.

A special rigidity between the bearing plate and the metal casing is achieved by injection-moulding or casting the bearing plate. In addition, the injection-moulding or casting operation provides a high degree of seal-tightness of the housing interior with relation to the surrounding atmosphere. When shaping the plastic bearing plate it will be ensured that the plastic material back grips metal elements for reasons of strength. It is not desirable that the heat dissipation element is fully enclosed by plastics, so that the heat dissipation is not impaired. Therefore, it is preferred that the heat dissipation elements remain virtually free from plastic injection-coating. However, this means that the corrosion strength of the metal is an important aspect. Preferably, the plastic material is applied at least to those metal points which have an imminent risk of corrosion due to the manufacturing method.

It is possible to provide the plastic bearing element, in which finally the armature shaft of the motor extends, directly in the plastic moulding process, depending on the tensile load. In a number of applications, however, the load on the bearing can be so high that the capacities of the plastic material used for the bearing plate cannot stand the load (for example, when subjected to heat). In a preferred aspect of the present invention a sintered metal bearing is inserted into the motor housing prior to the plastic injection moulding operation. The sintered metal bearing is then injection-coated by the plastic material for providing the plastic bearing element. The advantages of such sintered metal bearings are well known and need not be described herein.

It is favorable in the described arrangement that a comparatively large metal surface is exposed to the ambient air for heat dissipation. On the other hand, comparatively small boundary surfaces between metal and plastics will make the coupling force between the two housing elements insufficient. As a precaution, it is preferred that webs are provided that extend along the peripheral surface of the metal casing and that the overlapping surfaces of plastics and metal are positioned in areas which are uncritical with respect to heat dissipation, namely to an area remote from the bearing. Thus, webs extend over the peripheral surface of the motor, and their effect is comparable with tightening straps which fix the motor plate on the opposite end of the metal casing. In a particularly preferred aspect of the present invention, a circumferential plastic ring is provided at the fixing end of the webs which receives the webs in one piece and circumferentially back grips the frontal end of the metal casing in addition.

The webs can extend along the outside surface of the metal casing, thereby providing a plurality of advantages, as will be explained in the following. However, it can also be very favorable under the present invention that at least one or a plurality of webs extend along the inside surface of the metal casing. Of course, it is also possible that such webs extend in parallel, opposite to one another, on the inside and outside surfaces and that these webs are interconnected at the frontal ends of the metal casing by a plastic bridging element such as the above-mentioned plastic ring.

It is particularly favorable with such inside webs that plastic lugs for the subsequent fixing of the magnets be additionally formed on the inside webs. The plastic lugs can be injection-moulded separately on the inside surface of the metal casing, however, it is preferred to integrally connect them to the inside webs.

Of course, the stops mentioned herein can also be integrally connected to the above-mentioned plastic elements placed in the interior of the housing and can be injection-moulded in the same moulding operation.

Generally, fixing elements can be mounted on the metal housing by any suitable fixing method such as riveting, welding, or the like. For the purpose of simplification, the present invention prefers using metal tabs that are cut out to project from the motor for fixing the motor housing. The shortcoming of such tabs is that they permit the ingress of moisture into the interior of the motor. This is prevented by the plastic casing which encloses the tabs and abuts on the housing, thereby sealing the housing interior in relation to environmental influences.

In turn, the metal casing can be integrally connected to other plastic elements, for example, with the above-described webs or the plastic ring.

It is disclosed in the previously mentioned DE-OS 30 38 135 to squeeze the prefabricated heat dissipation elements between the plastic plate and the bearing or the metal casing. Advantageously, the present invention suggests a different approach wherein the heat dissipation element is formed of a metal lug, cut out from the metal casing, in a preferably curved or wound shape, and extending to the bearing element on the motor plate. The wound shape permits reducing the load on the material by the moulding operation, on the one hand. On the other hand, the length of the metal lug is sufficiently increased for cooling purposes, thereby providing an improved cooling effect.

Preferably only a rather slight material deformation of the metal lugs is made. The lugs are swung out of the metal casing, so that the metal is neither folded nor cracked. Further, metal lugs are achieved by this provision in the longitudinal direction of the housing which can be chosen to be as wide as desired. Thus, the width of the lugs can be conformed to the cooling effect desired.

As far as the bearing element is concerned, the curved metal lugs form portions of a ring. Thus, a metal ring is substantially produced by the curved portions which holds the bearing element and, for strength purposes, can be molded, at least in part, in the bearing element when the bearing element is shaped from plastics. The same applies with respect to the bearing plate itself, so that at least part of the metal lugs can be formed in the bearing plate.

On the one hand, a great degree of load capacity of the bearing is achieved by this construction, because the metal ring is integrally connected to the metal casing. On the other hand, the heat conductivity is considerably enhanced, because substantial quantities of heat can be dissipated through the broad metal lugs into the metal casing.

To increase the strength of the bearing, a metal ring is encompassed by the plastic bearing element. The metal ring formed by the ends of the metal lugs can comprise a sintered metal bearing which can also be provided as a calorie-type bearing. However, it must be ensured that the calotte-type bearing within the metal ring is pivotable even if the metal ring in the bearing element is injection-coated with plastics.

It has been described hereinabove that the plastic webs can end into a back-gripping plastic ring for being secured in position with respect to the metal casing. However, a fixation of the webs can also be achieved by using the periphery of the metal tabs as a fixation for a plastic web.

For example, the metal casing can be produced by casting, deep-drawing or any other shaping methods. Rolling sheet metal is a particularly straightforward measure for forming the metal casing, which is favorable in connection with the formed plastic elements. The metal casing can be formed of a simple rolled sheet-metal part which has back-gripping connecting tabs at the junction of the peripheral surface. The connecting tabs can be dovetailed, for example. Above all, shaping the metal casing in this manner is favorable because the provision of the plastic webs simultaneously permits a sealing of the joints with respect to environmental influences and a fixation of the connecting tabs with respect to each other. The webs thereby fulfill an additional function. According to another measure of securing this boundary position, plastic webs are provided in the connecting area both inside and outside the housing. Preferably, the plastic webs can be interconnected by plastic bridges through through-holes in the connecting tabs. The two opposed plastic webs are thereby furnished with an integral plastic connection which additionally protects the webs against a longitudinal movement with respect to the metal casing due to the undercut plastic material. This principle can be applied to all other plastic elements on the motor housing, as far as they are seated opposite each other on the inside and outside surfaces of the metal casing.

It is preferred that the cutting edge of the connecting tabs is additionally extended in the direction of the metal lug and thereby forms the end of the metal lug fixed to the metal casing.

The through-holes can secure the plastic element in a longitudinal direction due to the undercuts formed in the plastic material. Additionally, the through-holes can interconnect inwardly and outwardly opposed plastic elements.

It is a major advantage in the application of plastic material that all above-mentioned plastic elements can be formed onto the metal structure of the motor housing in one single moulding operation. Plating the metal with zinc is used to protect the desired large, open metal surfaces, which are exposed to environmental influences, against corrosion. It is suggested that the cutting edges of the metal jeopardized by corrosion are protected against corrosion by plastic webs or other plastic elements so that the plastic parts additionally serve for anti-corrosion purposes and also have the function of separate structural elements within the housing. As has been explained hereinabove, a fixation and an increased strength of the plastic bearing plate and the rolled sheet-metal casing can be achieved additionally by the plastic parts.

Preferably the motor housing is made by shaping all plastic parts in one single injection molding process and preferably the permanent magnets are squeezed in the prepared plastic lugs.

DETAILED DESCRIPTION OF THE PREFERRED EMBODIMENT

Figure 1:
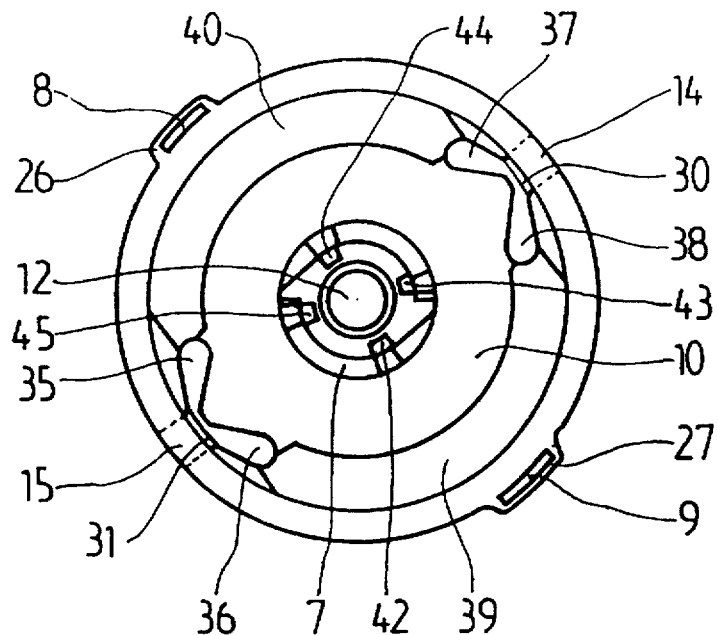
FIG. 1 is the motor housing of the present invention with a view directed from the open end of the motor housing into the interior.
Figure 2:
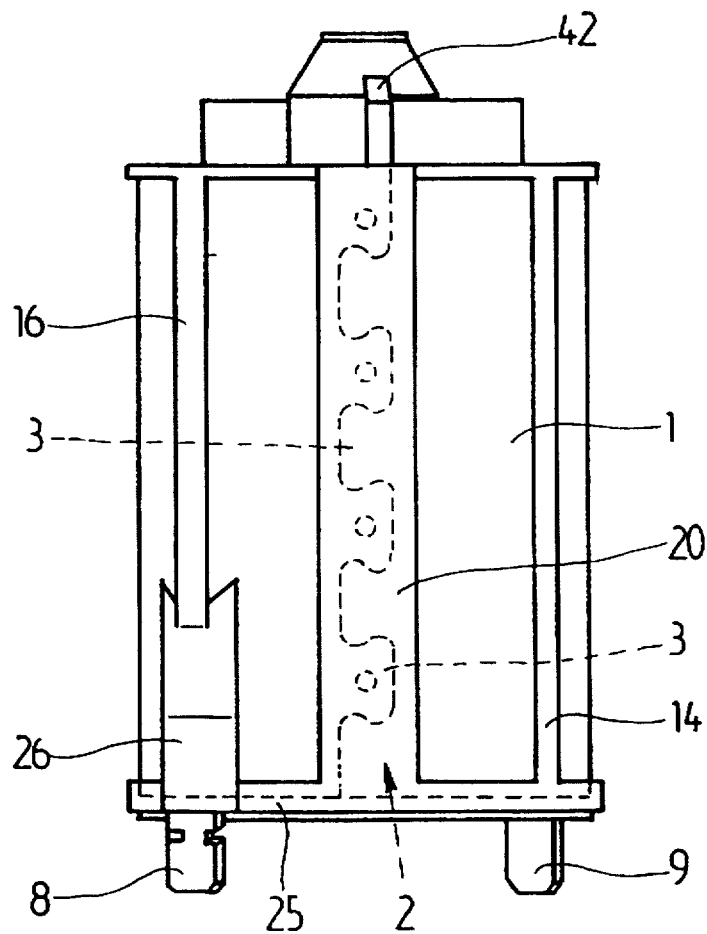
FIG. 2 is a top view of the housing in the position as shown in FIG. 1.

FIGS. 1 through 5 show a substantially cylindrical metal casing 1 which is formed by rolling a metal sheet. FIG. 2 shows a connecting area 2, where the two sheet metal ends are joined. Connecting tabs 3, extending from either side, can be seen which engage each other in an undercut in one plane, thereby forming a substantially wave-shaped separating line. Thus, a rolled, cylindrical metal casing is produced which is open on both sides. A heat dissipation element 4 which is important for the present invention is substantially formed of two metal lugs 5 and 6 having a predominantly C-shaped configuration. The curvature of the inner leg is increased compared to that of the outer leg of the respective metal lug 5, 6. The metal lug is shaped from the sheet metal of the metal casing 1 and is thereby formed integrally with it. The inner leg of the metal lugs form portions of a circular metal ring 7 which is not closed.

Two opposed metal tabs 8, 9, which serve to fasten the motor to a driving gear, for example, are bent out from the metal casing 1 at its open end. The ends of the metal tabs extend outside of the periphery of the metal casing 1. This way, a driving gear, aligned with the metal casing, can be flanged to the metal casing 1.

Figure 3:
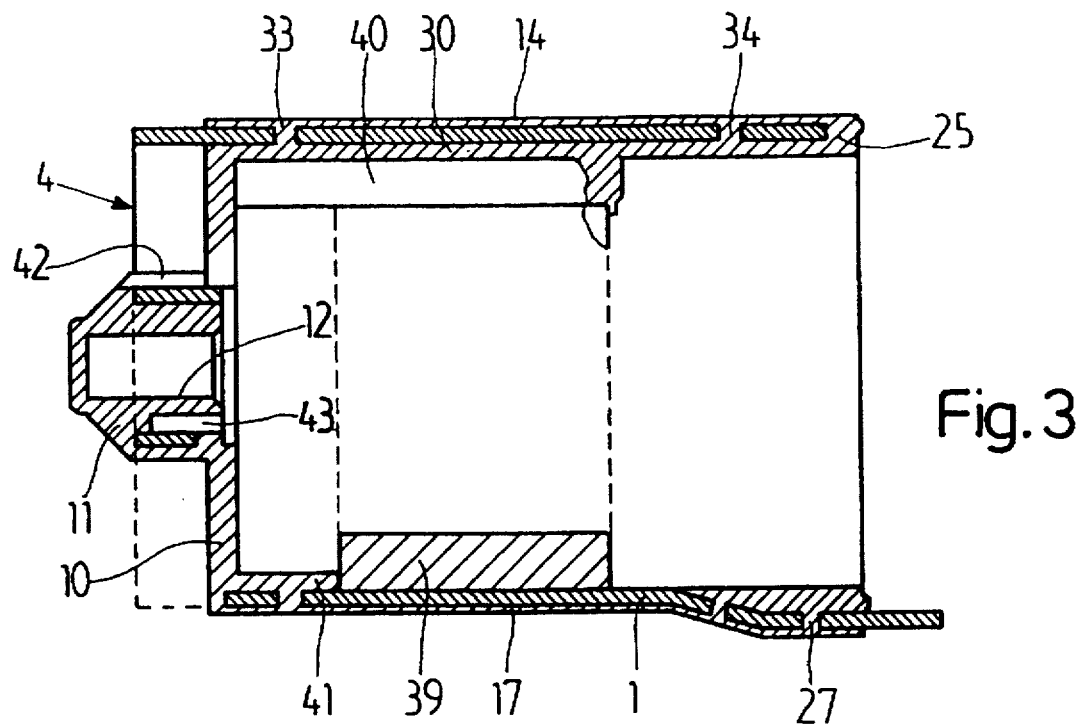
FIG. 3 is a longitudinal cross-sectional view, turned by approximately 30°, as a 90° sector of the housing of FIG. 1.
Figure 4:
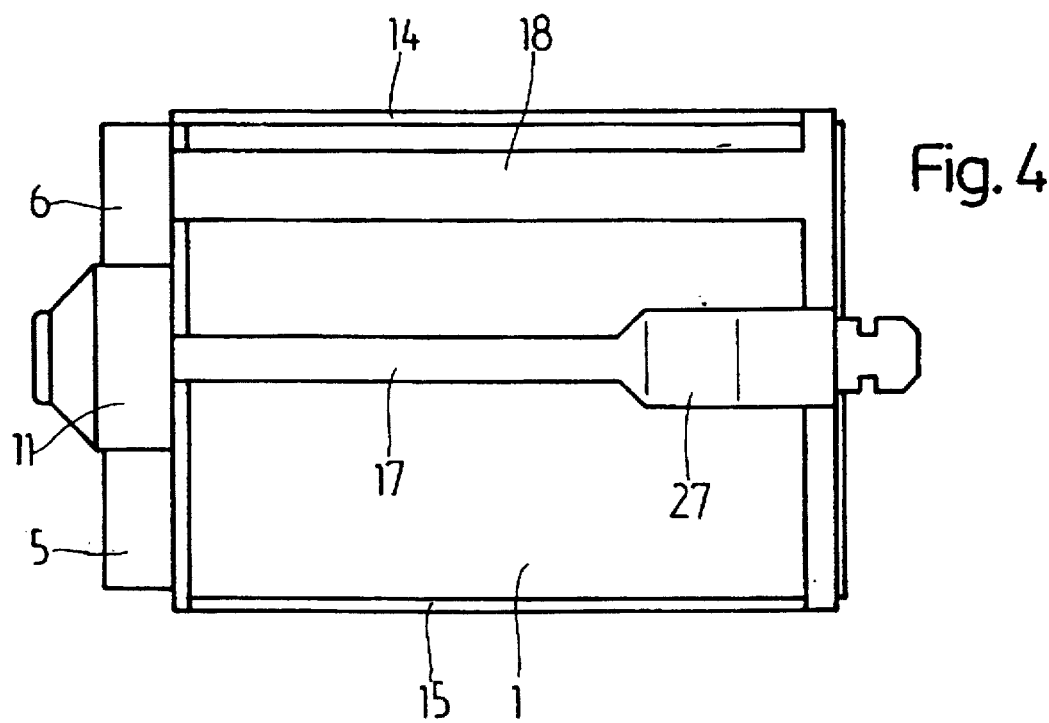
FIG. 4 is a top view of the housing approximately in the position as shown in FIG. 3.
Figure 5:
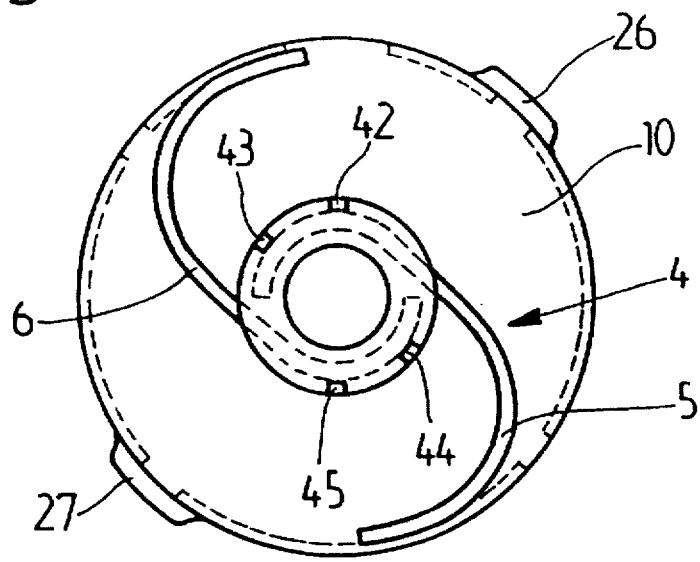
FIG. 5 is a view of the bearing plate of the motor from the direction opposite to FIG 1.
Figure 6:
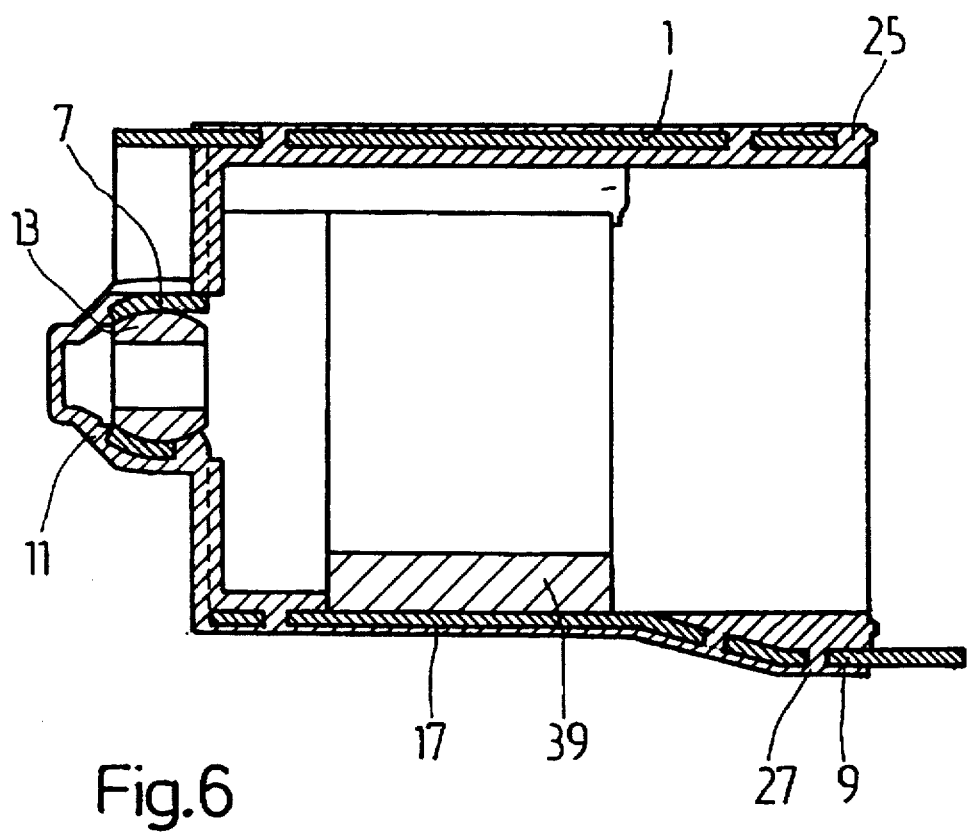
FIG. 6 is a cross-sectional view of the motor housing including a sintered-metal bearing in a position of the housing corresponding to FIG. 4.

The previously described construction has plastic elements at appropriate locations which are formed to the metal structure in one single joint moulding operation, for example, by injection-moulding or casting. The plastic elements substantially comprise a plastic plate 10 passing over into a bearing element 11 made of plastics. A bearing bore is machined in the bearing element and, subsequently, houses the armature shaft of the electric motor (FIG. 3). Also, a sintered-metal bearing 13 can be inserted in the bearing element (FIG. 6). The plastic material surrounding the bearing bore 12 or the sintered-metal bearing 13 is enclosed by the metal ring 7, and the sintered-metal bearing 13 can be retained directly by the metal ring 7 for an improved heat dissipation. A corresponding trough-shaped cross-section of the retaining ring can provide for a pivot bearing of the sintered-metal bearing which is designed as a calotte-type bearing. Additionally, it is achieved that the sintered-metal bearing 13 is retained in the longitudinal direction of the metal casing 1. This permits a particularly good heat dissipation from the bearing of the electric motor through the metal lugs 5, 6 into the metal casing 1 of the motor.

To increase the strength and to improve the tightness of the motor housing, and to mount a number of elements, the motor housing includes a number of webs extending in parallel to each other along the inner or outer surfaces of the metal casing 1. The webs start from the bearing plate 10 and terminate into a plastic ring 25 which embraces the end surface at the open end of the metal casing.

The bearing plate 10 is thereby secured in position on the metal casing 1 in a longitudinal direction. However, the webs can also terminate at other elements, such as a plastic plate 26 or 27 encompassing the metal tabs 8, 9, respectively. This is the case with webs 16 and 17. Web 20 is included in webs 14–24. Web 20 additionally seals the boundary between the two sheet-metal ends and thereby prevents moisture from entering the housing interior at the junctions of the connecting tabs 3.

Parallel extending inside webs 30, 31 are provided beneath the outside webs 14, 15. The outside webs 14, 15 are interconnected with the inside webs 30, 31 by through-holes 33, 34 so that the mentioned webs form a plastic unit which is secured in position in an axial direction of movement of the motor housing due to the undercuts in the through-holes 33, 34. Plastic lugs 35 to 38 (see FIG. 1), which extend in the longitudinal direction of the housing, are formed on the rather rigid structural unit. After the completion of the housing, the plastic lugs receive the permanent magnets 39, 40 which are slipped into the lugs and are respectively retained by two associated lugs of the two opposed lug pairs.

The principle of the through-holes and of the strength resulting from the plastic undercuts can also be used with respect to the plastic casing 26 or 27, as can be seen in FIG. 3, for example. Stops 41 (FIG. 3) formed to the plastics serve to define the final position of the magnets 39, 40 in the interior of the housing. Further, FIGS. 1 and 2 show openings 42, 43, 44, 45 which, partly coming from the outside or the inside, extend into the bearing element and serve to fix the metal structure during the casting operation.

To provide an anti-corrosion sheet-metal surface, the metal casing element is made of a mainly zinc-plated metal sheet, and the points of intersection of the metal sheet, having an imminent corrosion risk, are coated with plastic elements or plastic webs.

What is claimed is:

1. A motor housing comprising:

a substantially cylindrical metal casing suited to encompass the motor in its entirety, at least one bearing plate made of plastic material, a metal heat dissipation element composed of two metal lugs each having a predominantly C-shaped configuration connected integrally with the metal casing bent from the casing towards the bearing plate, and a substantially circular metal ring formed by the curved portions of said C-shaped metal lugs of said heat dissipation element;

wherein the plastic bearing plate is injection-molded to the metal casing and the heat dissipation element around said substantially circular metal ring.

2. The motor housing as claimed in claim 1, further including a plastic bearing element formed on the bearing plate by said substantially circular metal ring, wherein said metal ring comprises a sintered-metal bearing.

3. The motor housing as claimed in claim 1, wherein the bearing plate of the housing is secured in position with respect to the metal casing by a plurality of webs which extend in a longitudinal direction of the metal casing and grip the end surfaces of the metal casing.

4. The motor housing as claimed in claim 3, further including a plastic ring provided on the side of the metal casing remote from the bearing plate and said plastic ring for gripping the end surface of the metal casing, wherein the webs terminate into the plastic ring.

5. A motor housing as claimed in claim 3, wherein at least two of the webs extend opposite to one another along the inner surface of the metal casing.

6. The motor housing as claimed in claim 1, wherein plastic lugs are injection-molded to form an integral connection between the heat dissipation element and the metal casing for the purpose of retaining a magnet.

7. The motor housing as claimed in claim 6, wherein the webs are integrally connected with the lugs.

8. The motor housing as claimed in claim 1, further including at least one projection made of plastics which projects from the bearing plate into an interior of the metal casing and serves as a stop for a magnet.

9. The motor housing as claimed in claim 8, wherein the casing is connected integrally with the plastic projection made in the form of a web.

10. A motor housing as claimed in claim 9, wherein said bearing plate and casings are formed in one single, joint plastic casting or injection molding operation.

11. The motor housing as claimed in claim 1, wherein the metal casing includes an open end, and wherein two metal tabs project from the metal casing, and at least one portion of the tabs includes a plastic casing.

12. The motor housing as claimed in claim 11, wherein the metal ring comprises a sintered metal bearing.

13. A motor housing as claimed in claim 12, wherein the sintered metal bearing is a calotte-type bearing, and the metal ring has a trough-shaped cross-section for accommodating the bearing.

14. The motor housing as claimed in claim 1, wherein the metal casing is a rolled sheet-metal part, the connecting area of the rolled sheet being provided by connecting tabs gripping each other.

15. The motor housing as claimed in claim 14, wherein the connecting area is covered on an outside by a plastic web.

16. The motor housing as claimed in claim 15, further including through-holes provided in the metal casing in an area of the web, said through-holes being adapted to receive plastic material thereinto.

17. A motor housing as claimed in claim 16, further including plastic bridges in the through-holes.

18. The motor housing as claimed in claim 1, wherein the metal casing is made of zinc-plated sheet metal.

19. A method of manufacturing a motor housing comprising the steps of:

providing a metal casing suited to encompass the motor in its entirety, cutting a heat dissipation element out of said metal casing with a portion still attached to said metal casing, bending said heat dissipation element from the metal casing towards the center of said metal casing to form a sintered metal bearing, positioning the metal casing, the heat dissipation element, and said sintered metal bearing into a predetermined position, and injecting plastic in a single operation around said metal casing, said heat dissipation element and sintered metal bearing.

20. The method of manufacturing of a motor housing as claimed in claim 19, further including the steps of forming lugs of plastic and inserting magnets into the motor housing.

* * * * *